United States Patent
Derman

(10) Patent No.: US 6,227,502 B1
(45) Date of Patent: May 8, 2001

(54) ELECTRICAL CORD AND CABLE GRIPPER

(76) Inventor: Jay S Derman, P.O. Box 3823, Palos Verdes, CA (US) 90274-9533

( * ) Notice: Subject to any disclaimer, the term of this patent is extended or adjusted under 35 U.S.C. 154(b) by 0 days.

(21) Appl. No.: 09/536,439

(22) Filed: Mar. 28, 2000

(51) Int. Cl.⁷ .................................................... F16L 3/08
(52) U.S. Cl. ...................... 248/74.4; 248/74.1; 248/68.1
(58) Field of Search ........................... 248/56, 68.1, 74.1, 248/74.4, 316.4; 24/459

(56) References Cited

U.S. PATENT DOCUMENTS

| | | | |
|---|---|---|---|
| 2,650,948 | * | 9/1953 | Findlay ................................ 174/168 |
| 3,742,119 | * | 6/1973 | Newman ............................. 174/65 R |
| 4,036,289 | * | 7/1977 | Cheng et al. .......................... 165/82 |
| 4,167,211 | * | 9/1979 | Haller .................................... 165/78 |
| 5,860,681 | * | 1/1999 | Slais ................................ 285/137.11 |
| 5,990,420 | * | 11/1999 | Alexander ............................. 174/135 |

* cited by examiner

Primary Examiner—Anita M. King
Assistant Examiner—Holly N. Sy
(74) Attorney, Agent, or Firm—Monty Koslover

(57) ABSTRACT

A gripper device made of rigid material and having only two members. The two members are basically shaped alike, each having a single, longitudinal axis edge that faces and interlocks slidingly with the other. One of the members has a number of cord or cable retaining cut-outs cut through an axis perpendicular to the sliding axis of the facing members. Provision is made for preventing the relative sliding of the members when cords or cables are being retained by the device, which can be secured by a single lock. The gripper device is small, easy to use and economic to produce.

2 Claims, 3 Drawing Sheets

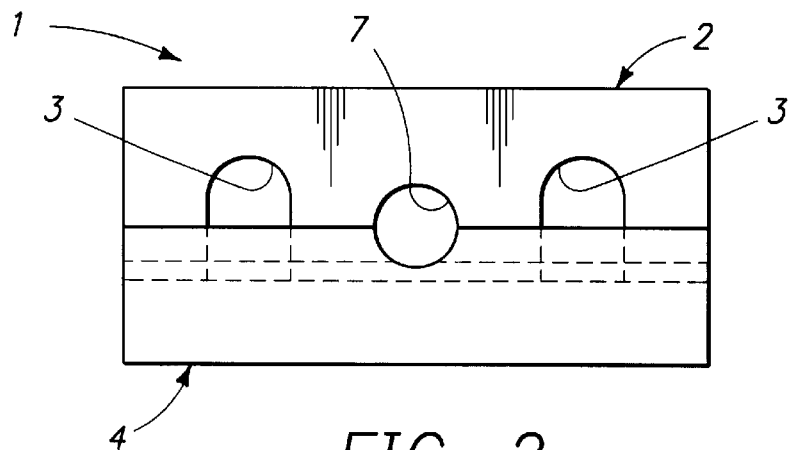
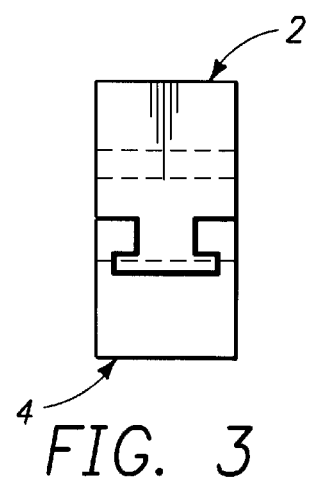
FIG. 2     FIG. 3
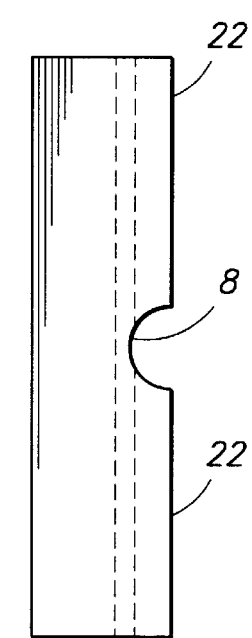
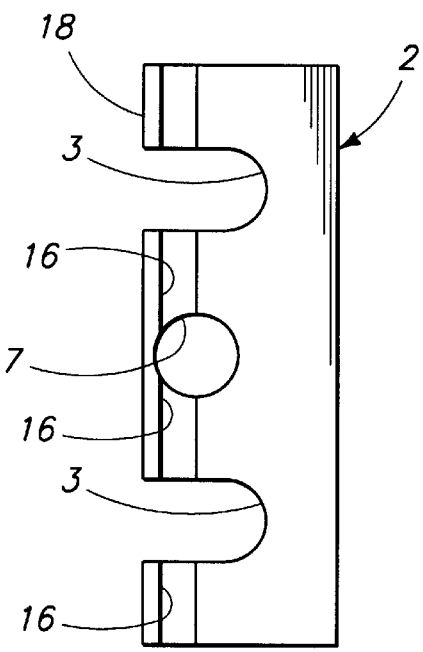
FIG. 4     FIG. 6
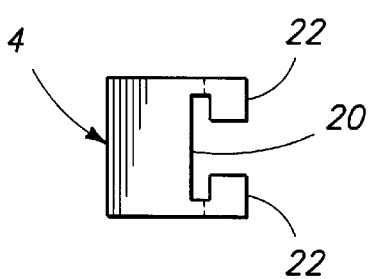
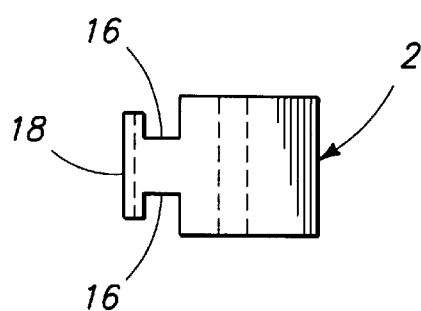
FIG. 5     FIG. 7

ELECTRICAL CORD AND CABLE GRIPPER

BACKGROUND OF THE INVENTION

1. Field of the Invention

This invention relates to devices for securing small portable equipment from theft, and more particularly to a gripping device for securing electrical cords or cables that are attached to portable electrical equipment.

2. Background

Wire rope security cables are often used to secure small portable electrical equipments. In a typical application, the wire rope cable may have a bulbous free end and requires a lock to secure the cable. Equipment data cords and power cords with connector or prong plug ends, have also been used together with various locking devices to secure the equipment from theft or unauthorized use. In each case, a separate lock attachment is generally needed for each equipment.

It would therefore be useful to have a device that can be used to grip a multiple number of electrical cords or security cables at the same time, and need only a single lock attachment.

SUMMARY OF THE INVENTION

The device is a gripper made of rigid material and comprises two members that are connected by interlocking surfaces that permit relative sliding apart of the two members. A locking opening through both device members and the interlocking surfaces is provided for use by a separate locking device to prevent sliding action of the gripper. Cut-outs are made in the sliding edges of a top member to allow a wire rope cable or electrical cord to be placed therein when the top member is disengaged from the bottom member. The bottom member can then be re-engaged and slid in place. After this, the locking opening is used to cooperate with a single locking device such as a cable, shaft or padlock, to retain the inserted cables or electrical cords. The gripping device is small, simple to use and inexpensive.

It is therefore a prime object of this invention to provide a simple method of securing a multiple number of security cables, power or data cords that are connected to portable electrical equipment, and using a single locking device.

An advantage of this invention over other gripping type devices is its simplicity and relative ease of use.

Further objects and advantages of the invention will be apparent from studying the following portion of the specification, the claims and the attached drawings.

BRIEF DESCRIPTION OF THE DRAWINGS

FIG. 2 is a side elevational view of the gripper according to the present invention;

FIG. 3 is an end view of the gripper device, particularly showing the interlocking shape by which the top member is engaged with the bottom member;

FIG. 4 is a side elevation view of the bottom member of gripper device;

FIG. 5 is an end elevation view of the bottom member, particularly showing its interlocking portion cavity retaining edges and surfaces;

FIG. 6 is a side elevation view of the top member of the gripper device, particularly showing detail of cable or cord cut-outs and an interlocking portion;

FIG. 7 is an end elevation view of the top member, particularly showing its slide projecting surfaces and edges that mate and interlock with the bottom member.

DESCRIPTION OF THE PREFERRED AND ALTERNATE EMBODIMENTS

Figure 1:
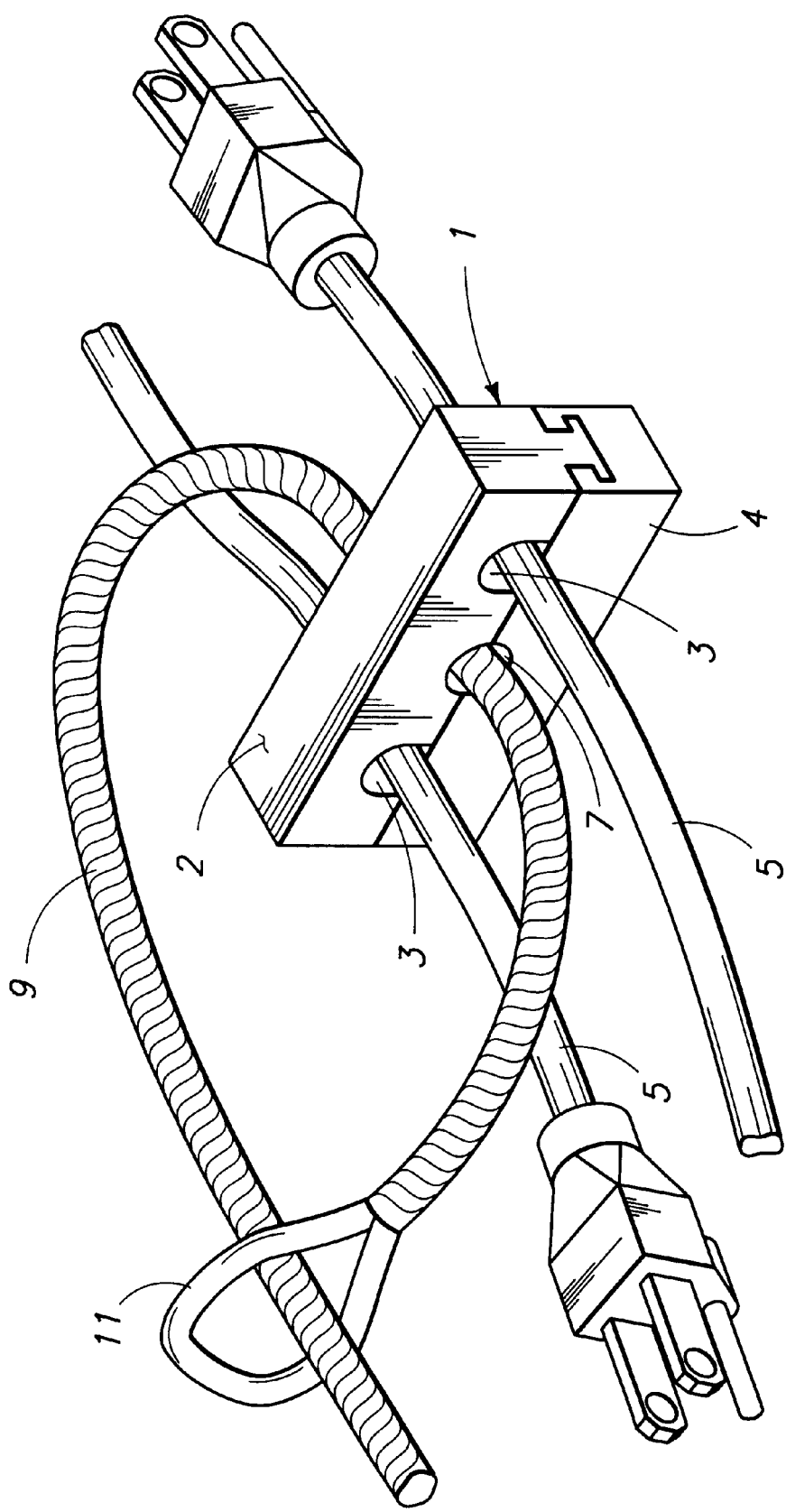
FIG. 1 is a perspective view of a preferred embodiment of the present invention gripper device, showing two equipment power cords being retained by the device and a wire cable having a loop on one end acting to lock the device.

Referring particularly to the drawings, there is shown in FIG. 1 a perspective view of a preferred embodiment of the present invention gripper device 1, showing two electrical power cords 5 each inserted in a cut-out 3, and locked in place by use of a wire cable 9 that is inserted by its swaged end through a locking hole 7 in the side of the gripper 1 and thence through a cable end loop 11. The gripper 1 has only two component parts; a top member 2 and a bottom member 4 which are designed to slide over and interlock with each other. When a locking device such as the wire cable 9 shown, a shaft or padlock are passed through the locking hole 7, the two members can not slide apart from each other and must remain engaged. If the electric cords are attached to portable equipments at the time, the portable equipments will also be held at that location. Securing the equipments can be done using a wire cable 9 such as shown in FIG. 1, connected at its distal end by a single lock to a suitable fixed location. It should be noted that a wire cable having a bulbous end and a distal swaged end could also be used as the locking device to pass through the locking hole and secure by a lock.

The gripper is easy to use: First, the top member 2 is slid off the bottom member 4 and two electrical cords or cables are placed each in a cut-out 3 in the top member 2. Second, the bottom member 4 is slid back on to the top member 2, engaging the top member over its full length. Third, a locking device such as a wire cable, shaft or padlock is inserted through the locking hole 7 in the gripper 1. The gripper 1 itself can then be secured by means of the locking device to a secure location by a single lock.

Refer now to FIGS. 2 and 3 which are respectively, a side elevation view and an end elevation view of the invention gripper 1 device. The gripper 1 comprises only two components: a top member 2 and a bottom member 4, both of which are made of a rigid material. An interlocking means holds the two members together while at the same time allowing one to slide longitudinally with respect to the other. The interlocking means in this embodiment as shown in FIG. 3 is a T-shaped cross-section strip projecting from the lower longitudinal edge of the top member 2, mating with a T-shaped cross-section cavity in the top longitudinal edge of the bottom member 4. The strip and cavity surfaces are made straight and smooth so that one member may slide easily off the other. Any configuration cross-section projecting strip and cavity may be used, providing only that it is interlocking and permits easy longitudinal sliding of the members. The configuration shown however is believed to be the most simple and economic, and was selected for this reason. This is also true of the general shape of the gripper, which may be any shape, so long as it includes an interlocking, sliding means engaging both members.

Two cut-outs 3 are made vertically in the sliding longitudinal surfaces of the top member 1. The cut-outs 3 are intended for receiving and retaining any electric cords or cables that the gripper user wishes to hold. A locking hole 7 is cut through the sides of the top member 2, with the locking hole 7 center axis located approximately at the edge that separates the top member 1 from the bottom member 4. A deep groove 8 that is equivalent in size and location to a lower half of the locking hole 7, is cut across the top sliding surface of the bottom member 4. Thus, when the two members 2, 4 are fully interlocked, the locking hole 7 and groove 8 line up, permitting a locking device to be inserted in the hole 7.

Cooperation of a locking device with the locking hole 7 prevents longitudinal relative sliding movement of the two members and the gripper can then be secured by a single lock.

FIGS. 4, 5, 6 and 7 show detail of the top and bottom members. FIG. 4 particularly draws attention to the groove 8 that is cut across the top sliding surface 22 of the bottom member 4. The location of the groove 8 closely matches that of locking hole 7, so as to lay over the bottom half of the hole when the two members 2, 4 are fully interlocked. In FIG. 5, it is seen that the cavity 20 is T-shaped in cross-section.

FIGS. 6 and 7 are side and end views respectively of the top member 2. A T-cross-section shaped projection is formed along the top member lower edge 18 and sized to fit in the mating cavity 20 in the bottom member. A deep groove 16 is cut parallel with the lower edge 18 in both opposing sides of the top member 2. The two cut-outs 3 have a width sufficient to accept an electric power cord or cable, and a depth or height at least twice the diameter of a power cord or cable to be placed therein. This allows for overlapping of the bottom member interlocking portion with the top member so that an inserted cord or cable is wholly through only the top member 2 as required.

Figure 8:
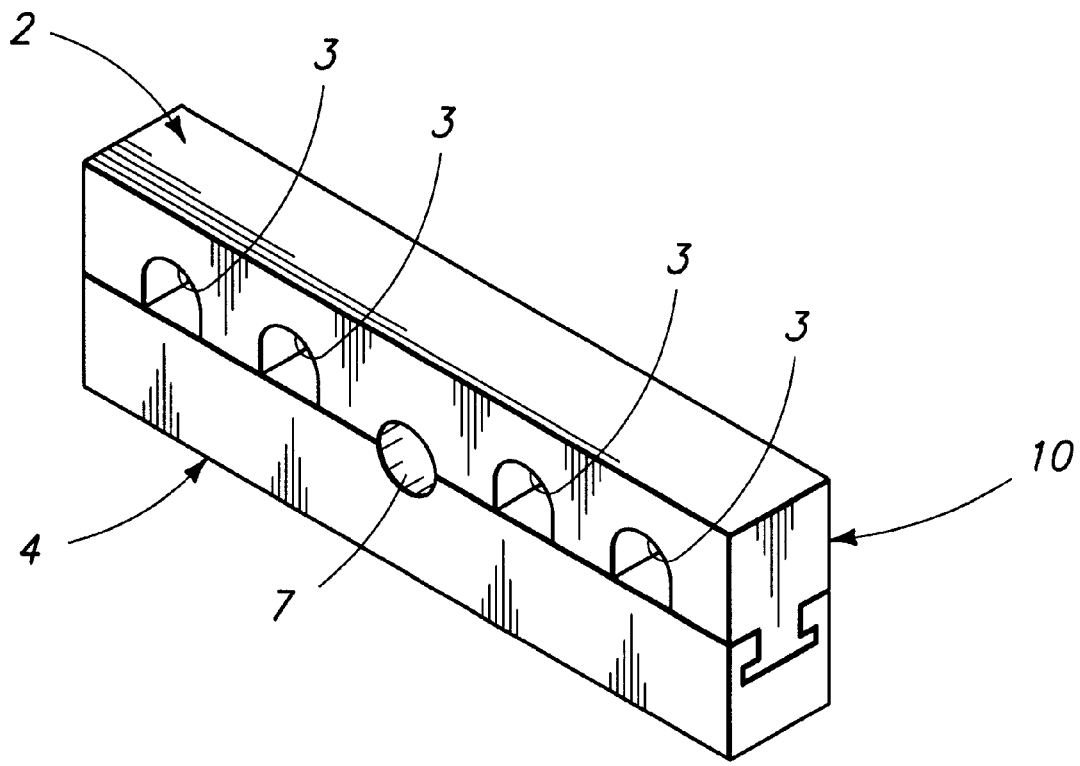
FIG. 8 is a perspective view of a gripper device according to the present invention, having more than two cut-outs for gripping cables or electrical cords.

As shown in FIG. 2, the gripper 1 is very small in size and can be made to be quite light in weight. Although only two cut-outs 3 for electrical cords or cables are shown, a gripper may include multiple cut-outs for more than two cords or cables. Such a gripper 10 is illustrated in a perspective of an alternate embodiment in FIG. 8. Except for the addition of multiple cut-outs 3, this embodiment gripper 10 is identical in every aspect to that described earlier herein. Only one locking hole 7 is required for use with a locking device in blocking sliding disengagement of the two members 2, 4.

The device is simple to use, economical to produce and may be sized to closely fit any electrical cords or cables and a selected locking wire rope cable, shaft or padlock.

From the foregoing description, it is believed that the preferred and alternate embodiments achieve the objects of the present invention. Various modifications and changes may be made to the gripper device described above which are apparent to those skilled in the art. These alternatives and modifications are considered to be within the scope of the appended claims and are embraced thereby.

What is claimed is:

1. A gripper device for attachment to electrical cords or cables, comprising:

a top member made of a block of rigid material and having an elongated generally rectangular shape, said rectangular shape defining two paralleled, planar longitudinal side faces, a top face, and a bottom face that is orthogonal to said side faces; said bottom face including a longitudinal, downwardly projecting portion configured to form a T-shaped channel for use in sliding engagement with a mating portion; said top member including a multiplicity of cut-outs cut vertically through said channel and through said side faces, and including a locking hole bored through said side faces at an angle of approximately 90 degrees, said cut-outs each being sized to seat and retain an electrical cord or cable therein, said locking hole being centered on the edges of said bottom face and sized to accept a locking device; and a bottom member made of a block of rigid material and having an elongated generally rectangular shape and length matching that of said top member; said rectangular shape defining two paralleled, planar longitudinal side faces, a bottom face, and a top face that is orthogonal to said side faces; said top face of said bottom member including a longitudinally extending T-shaped cavity therein that is sized to interlock with said T-shaped channel in sliding engagement; said bottom member including a semi-circular shaped groove cut through the sides and top surface of said T-shaped cavity, said groove matching the longitudinal location of said locking hole so that, when said bottom member is fully interlocked with said top member, said groove will line up with the lower half of said locking hole, for permitting insertion of a wire cable, shaft or padlock that cooperates with said locking hole to prevent relative sliding apart of the two members.

2. A gripper device for attachment to electrical cords or cables, comprising:

a top member made of a block of rigid material and having an elongated generally rectangular shape, said top member having a straight, generally flat, longitudinal bottom surface, said bottom surface including a multiplicity of deep cut-outs cut across the member, said cut-outs each being sized to receive and retain an electrical cord or cable that is placed therein;

a bottom member made of a block of rigid material and having an elongated generally rectangular shape and length matching that of said top member; said bottom member having a longitudinal top surface that matches the length of the bottom surface of said top member; and means for slidingly interlocking said bottom surface of said top member with said top surface of said bottom member, forming a gripper assembly; said gripper assembly including a locking opening passing through and between both said top member and said bottom member, for preventing relative sliding movement of each member when a cable, shaft or padlock is passed through said locking opening.

* * * * *